United States Patent
Xie et al.

(10) Patent No.: US 11,739,213 B2
(45) Date of Patent: Aug. 29, 2023

(54) UV-CURABLE NON-ISOCYANATE POLYUREA POLYMER AND UV-CURABLE COATING COMPOSITION CONTAINING THE SAME

(71) Applicant: Guangdong Huarun Paints Co., Ltd., Guangdong Sheng (CN)

(72) Inventors: Han Xie, Guangdong Sheng (CN); Shigang Fan, Guangdong Sheng (CN); Xi Zhao, Guangdong Sheng (CN)

(73) Assignee: GUANGDONG HUARUN PAINTS CO., LTD., Foshan (CN)

( * ) Notice: Subject to any disclaimer, the term of this patent is extended or adjusted under 35 U.S.C. 154(b) by 435 days.

(21) Appl. No.: 16/968,086

(22) PCT Filed: Feb. 8, 2019

(86) PCT No.: PCT/IB2019/000126
§ 371 (c)(1),
(2) Date: Aug. 6, 2020

(87) PCT Pub. No.: WO2019/155281
PCT Pub. Date: Aug. 15, 2019

(65) Prior Publication Data
US 2021/0024746 A1 Jan. 28, 2021

(30) Foreign Application Priority Data
Feb. 8, 2018 (CN) .......................... 201810127536.8

(51) Int. Cl.
*C08L 75/02* (2006.01)
*C08L 51/08* (2006.01)
*C09D 175/02* (2006.01)

(52) U.S. Cl.
CPC .............. *C08L 75/02* (2013.01); *C08L 51/08* (2013.01); *C09D 175/02* (2013.01); *C08L 2312/06* (2013.01)

(58) Field of Classification Search
CPC ...... C08L 75/02; C08L 51/08; C08L 2312/06; C09D 175/02; C09D 4/06; C09D 175/16; C08F 222/02; C08F 220/06; C08F 222/16; C08F 265/06; C08G 18/673; C08G 18/797; C08G 71/02
See application file for complete search history.

(56) References Cited

U.S. PATENT DOCUMENTS

| | | | |
|---|---|---|---|
| 4,328,138 A | 5/1982 | Lin et al. | |
| 5,371,148 A | 12/1994 | Taylor et al. | |
| 5,439,982 A | 8/1995 | Taylor et al. | |
| 2002/0168164 A1 | 11/2002 | Bishop et al. | |
| 2015/0099843 A1 | 4/2015 | Hartig et al. | |
| 2016/0060478 A1 | 3/2016 | Kendi et al. | |
| 2017/0058074 A1* | 3/2017 | Kumar | C08G 18/673 |

FOREIGN PATENT DOCUMENTS

| | | | |
|---|---|---|---|
| CN | 105273184 A | | 1/2016 |
| CN | 106008966 A | | 10/2016 |
| CN | 106977890 A | | 7/2017 |
| CN | 107075077 | | 8/2017 |
| JP | 2016169318 | * | 9/2016 |
| WO | 2016/126606 A1 | | 8/2016 |
| WO | 2017/127544 A1 | | 7/2017 |

OTHER PUBLICATIONS

International Patent Application No. PCT/IB2019/000126, filed Feb. 8, 2019; The International Search Report of the International Searching Authority dated Jul. 31, 2019, 7 pages.
International Patent Application No. PCT/IB2019/000126, filed Feb. 8, 2019; Written Opinion of the International Searching Authority dated Jul. 31, 2019, 6 pages.
Suqing et al., "Aliphatic thermoplastic polyurethane-ureas and polyureas synthesized through a non-isocyanate route", 2015, RCS Adv., 5:6843-6852.
Suqing et al., "Crystallizable and Tough Aliphatic Thermoplastic Polyureas Synthesized through a Nonisocyanate Route", Ind Eng Chem Res., Feb. 4, 2016, 55:1902-1911.
Extended European Search Report issued for European application No. 19750310.5, dated Oct. 8, 2021 (7 pages).

* cited by examiner

*Primary Examiner* — Robert S Jones, Jr.
*Assistant Examiner* — Jiangtian Xu

(57) ABSTRACT

Provided are a UV-curable non-isocyanate polyurea polymer and a UV-curable coating composition containing the same. The UV-curable non-isocyanate polyurea polymer has one or more ethylenically unsaturated functional groups and the ethylenically unsaturated functional groups are attached to nitrogen atoms present in a backbone urea segment via —C(=O)- linkage. The nonisocyanate polyurea polymer is prepared by: (i) providing an ethylenically unsaturated compound having one or more carboxylic acid functional groups; and (ii) reacting said ethylenically unsaturated compound having one or more carboxylic acid functional groups with a multi-carbodiimide polymer to form the non-isocyanate polyurea polymer.

9 Claims, No Drawings

UV-CURABLE NON-ISOCYANATE POLYUREA POLYMER AND UV-CURABLE COATING COMPOSITION CONTAINING THE SAME

This application claims the benefit of Chinese priority application number 201810127536.8, filed on 8 Feb. 2018, the entirety of which is hereby incorporated by reference.

TECHNICAL FIELD

The present invention relates to a UV-curable non-isocyanate polyurea polymer and a process for the preparation of the polymer. The present invention further relates to a UV-curable coating composition comprising the above UV-curable non-isocyanurate polyurea polymer and an article coated therewith.

BACKGROUND

Polyurea resin is a kind of high-performance material, which mechanical properties can be changed from elastic to rigid body in a wide range, and which comprehensive properties such as wear resistance, slip resistance and strength are the best among existing polymer materials. Currently, polyurea polymers are mostly prepared by reacting isocyanates with polyamines. The highly toxic polyisocyanate materials used in the preparation of polyurea and the highly toxic phosgene materials used in the preparation of polyisocyanate pose a hazard to human health and environment. At the same time, the isocyanate can react with water or moisture to form bubbles, which affect the performance of polyurea.

In recent years, using non-isocyanate methods to synthesize polymers, such as polyurethanes or polyureas, has become a research hotspot. For example, CN106008966 discloses a process for the preparation of a hybrid non-isocyanate polyurethane by carbon dioxide. CN 105273184 discloses a process for the preparation of biodegradable thermoplastic polyurethanes by a non-isocyanate process. Specifically, the process employs an exchange reaction of a molten urethane with an aliphatic diamine diester and a diol in the presence of a catalyst. The inventors of this patent application alleged that the prepared polyurethane is easily crystallized, has a high melting point and good mechanical properties, and is advantageous for adjusting and controlling the molecular structure. Li Suqing et al., discloses in RSC Adv, 2015, 5, 6843, Ind Eng Chem Res., 2016, 55, 1902, that a high molecular weight thermoplastic polyurea is synthesized with a transesterification of a diurethane diol with a diamine. However, these methods all have the drawbacks of harsh reaction conditions and cumbersome reaction processes.

There is still a need in the coatings industry for improved processes for synthesizing non-isocyanate polyurea polymers.

SUMMARY

In one aspect, the present invention provides a UV-curable non-isocyanate polyurea polymer having one or more ethylenically unsaturated functional groups, wherein the ethylenically unsaturated functional group is attached to a nitrogen atom present in the backbone urea segment via —C(=O)-linkage. Preferably, the non-isocyanate polyurea polymer comprises, relative to the total weight of the non-isocyanate polyurea polymer, 3 wt % or more of the ethylenically unsaturated functional groups. Optionally, the non-isocyanate polyurea polymer further comprises one or more carbodiimide groups within its backbone segments.

In embodiments of the present invention, the non-isocyanate polyurea polymer is prepared by:
(i) providing an ethylenically unsaturated compound having one or more carboxylic acid functional groups; and
(ii) reacting said ethylenically unsaturated compound having one or more carboxylic acid functional groups with a multi-carbodiimide polymer to form the non-isocyanate polyurea polymer.

In one embodiment of the present invention, providing an ethylenically unsaturated compound having one carboxylic acid functional group comprises providing acrylic acid or methacrylic acid.

In another embodiment of the present invention, providing an ethylenically unsaturated compound having one carboxylic acid functional group comprises esterifying a hydroxyalkyl acrylate with a dibasic carboxylic acid, thereby forming the ethylenically unsaturated compound having one carboxylic acid functional group.

In still another embodiment of the present invention, providing an ethylenically unsaturated compound having more than one carboxylic acid functional groups comprises:
i) carrying out a ring-opening reaction of a polyglycidyl extender with (meth)acrylic acid, to form a hydroxyl intermediate having an ethylenically unsaturated functional group; and ii) esterifying the resulting hydroxyl intermediate with a dibasic carboxylic acid, thereby forming the ethylenically unsaturated compound having more than one carboxylic acid functional groups.

In another aspect, the present invention provides a process for the preparation of a UV-curable non-isocyanate polyurea polymer comprising the steps of: (i) providing an ethylenically unsaturated compound having one or more carboxylic acid functional groups; and (ii) reacting said ethylenically unsaturated compound having one or more carboxylic acid functional groups with a multi-carbodiimide polymer to form the non-isocyanate polyurea polymer. Preferably, the ethylenically unsaturated compound having one or more carboxylic acid functional groups reacts with the multi-carbodiimide polymer stoichiometrically.

In yet another aspect, the present invention provides a UV-curable coating composition comprising the UV curable non-isocyanate polyurea polymer according to the present invention, an optional reactive diluent and a photoinitiator.

In yet another aspect, the present invention provides an article comprising a substrate coated with the UV curable coating composition according to the present invention or a coating formed therefrom. Preferably, the substrate comprises a wood substrate, a plastic substrate, or a metal substrate.

The UV-curable non-isocyanurate polyurea polymer of the present invention is prepared via a non-isocyanate process and thus the resulting reaction product is substantially free of isocyanate component, preferably completely free of isocyanate component. The polyurea polymer thus obtained has a sufficient amount of ethylenically unsaturated functional groups which, when included in a coating composition, can be UV-cured to form a coating having excellent coating properties such as chemical resistance and the like.

Further, the UV-curable non-isocyanurate polyurea polymer of the present invention is formed by reacting an ethylenically unsaturated compound having one or more carboxylic acid functional groups with a multi-carbodiimide polymer. The method can be carried out in a stoichiometric manner at room temperature and atmospheric pressure, and has the advantages of simple process, high yield and few by-products.

The details of one or more embodiments of the invention will be set forth in description below. The other features, objectives, and advantages of the invention will become apparent.

Selected Definitions

As used herein, "a", "an", "the", "at least one", and "one or more" are used interchangeably, unless indicated otherwise. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term "polymer" refers to a macromolecule that comprises a plurality of units practically or conceptually derived from molecules having lower molecular weight. Usually, the term "polymer" can describe those macromolecules having a relatively high molecular weight, wherein the effect on their properties by addition or removal of one or several units is negligible (but it is not always the case, for example, where some property of polymer critically depends on the fine details of the molecular structure). In particular, in the present invention the effect of end groups of the polymer on its physical properties is negligible.

The term "non-isocyanate" when used in reference to "polyurea polymer" means that the starting material used to prepare the polyurea polymer is free of isocyanate components, preferably completely free of isocyanate components. Thus, the polyurea polymer according to the invention is substantially free of isocyanates, preferably essentially free of isocyanates in nature, more preferably completely free of isocyanates.

The term "ethylenically unsaturated compound" means a compound containing an ethylenically (C=C) unsaturated functional group.

The term "multi-carbodiimide polymer" means a polymer having a plurality of carbodiimide functional groups (—N=C=N—) in its skeleton. In an embodiment in accordance with the invention, Lupranate 5500XL, commercially available from BASF, is used as an example of a multi-carbodiimide polymer, the structure of which is as follows:

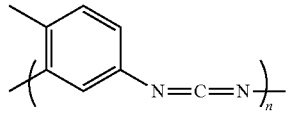

in which n is in the range of 1-100.

In the UV-curable non-isocyanate polyurea polymer according to the present invention, the term "divalent saturated hydrocarbon group" means a divalent hydrocarbon group having a linear, branched or cyclic structure and containing no an unsaturated group such as a carbon-carbon double bond —C=C— and a carbon-carbon triple bond —C≡C-excluding the carbon-carbon double bond of the aromatic hydrocarbon. Examples of suitable divalent saturated hydrocarbon groups include alkylene groups such as methylene, ethylene, propylene, tetramethylene, pentamethylene, 1,3-dimethylpropylene, 2,2-dimethyl propylene, 3-methylpentamethylene, cyclohexylene, or 1-isopropyl-2,2-dimethylpropylene; or an arylene group such as an o-phenylene, m-phenylene, p-phenylene, 1-methyl-o-phenylene, 1-methyl-m-phenylene, 1-methyl-p-phenylene, 2-methyl-o-phenylene, 2-methyl-m-phenylene, 2-methyl-p-phenylene.

In the UV-curable non-isocyanate polyurea polymer according to the present invention, the term "organic segment" means a moiety derived from an organic compound containing carbon, hydrogen, and optionally oxygen, nitrogen, sulfur, phosphorus, and the like. According to the invention, the organic segments may be derived from ethylenically unsaturated compounds having one or more carboxylic acid functional groups and thus comprise ethylenically unsaturated functional groups.

According to the invention, the term "reactive diluent" means any free-radically polymerizable ethylenically unsaturated compound used to adjust the viscosity of the coating composition, including but not limited to, styrenics, halogenated olefins, vinyl acetate, (meth)acrylates.

When used in reference to a "UV curable non-isocyanurate polyurea polymer", the term "substantially free" isocyanate means that the polyurea polymer of the present invention comprises less than 1000 parts per million (ppm) of the isocyanate; the term "essentially free" isocyanate means that the polyurea polymer of the present invention comprises less than 100 ppm of the isocyanate; and the term "completely free" isocyanate means that the polyurea polymer of the present invention comprises less than 20 parts per billion (ppb) the isocyanate.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

According to the first aspect of the present invention, the present invention provides a UV-curable non-isocyanate polyurea polymer having one or more ethylenically unsaturated functional groups, wherein the ethylenically unsaturated functional group is attached to a nitrogen atom present in the backbone urea segment via —C(=O)-linkage.

The polymer according to the present invention is formed by condensation of a raw material without an isocyanate, which contains a urea (—NH—CO—NH—) linkage in its backbone segment, and is therefore referred to as a "non-isocyanate polyurea polymer". Preferably, the polymer contains a sufficient amount of urea linkages to provide the coating properties required for intended end applications. Such coating properties include flexibility, wear resistance, chemical resistance and/or processability. Preferably, the polyurea polymer has on average at least about 5 urea linkages per one polymer molecule, preferably at least about 10 urea linkages per one polymer molecule, more preferably at least about 20 urea linkages per one polymer molecule, still more preferably at least about 30 urea linkages per one polymer molecule and even more preferably at least about 50 urea linkages per one polymer molecule. Although the upper limit of the number of urea linkages present in the polyurea polymer is not particularly limited, and may vary depending on the molecular weight of the prepolymer, in some embodiments the polyurea polymer may contain on average less than about 100, less than about 80, or less than about 70 urea linkages per one polymer molecule.

The non-isocyanate polymer may comprise a molecular backbone having any suitable structure. The backbone may have different structures, depending on a variety of factors, such as raw materials used for forming the backbone, costs, and the intended end use of the polymer. The backbone comprises optionally one or more further step-growth linkages, such as an amide linkage, an ester linkage, a carbonate linkage, an ether linkage, an imide linkage, an imine linkage, a urethane linkage, or any combination thereof. Additionally, the backbone of the non-isocyanate polyurea polymer comprises optionally one or more oligomer or prepolymer segments, which may be selected from, for example, an aromatic segment, an alkane segment, an acrylic segment, an epoxy segment, a polyamide segment, a polyester segment, a polycarbonate segment, a polyether segment, a polyimide segment, a polyimine segment, a segment of copolymer thereof, and a combination thereof.

Optionally, the non-isocyanate polyurea polymer further comprises one or more carbodiimide functional groups in the backbone. Thus, the non-isocyanurate polyurea polymer of the present invention can also be added as a curing agent to a coating composition, thereby expanding its application window. However, in a presently preferred embodiment of the present invention, the non-isocyanate polyurea polymer does not contain a carbodiimide functional group in the backbone.

The non-isocyanate polyurea polymer according to the invention comprises one or more ethylenically unsaturated functional groups and is therefore suitable for UV curing, also referred to as "UV-curable non-isocyanate polyurea polymer".

In the context of the present invention, ethylenically unsaturated functional groups generally refer to ethylenically (C=C) unsaturated groups. In view of the UV curing application of the non-isocyanate polyurea polymer of the present invention and its cost, the ethylenically unsaturated functional group is preferably a (meth)acrylate group. In embodiments of the present invention, the non-isocyanate polyurea polymer comprises, relative to the total weight of the non-isocyanate polyurea polymer, 3 wt % or more of the ethylenically unsaturated functional groups. Preferably, the concentration of the ethylenically unsaturated functional groups is 4 wt % or more, 5 wt % or more, 6 wt % or more, 7 wt % or more, 8 wt % or more relative to the total weight of the non-isocyanate polyurea polymer. According to the present invention, it is preferred that the UV curable non-isocyanurate polyurea polymer has a higher weight percentage of ethylenically unsaturated functional groups, but the weight percentage of ethylenically unsaturated functional groups is considered as to be less than 15 wt % relative to the total weight of the UV curable non-isocyanate polyuria polymer, in view of actual conditions. Conveniently, the weight percentage of ethylenically unsaturated functional groups of the UV-curable non-isocyanate polyuria polymer can be evaluated as follows:

$$C_{ethylenically\ unsaturated\ functional\ groups}\ (\%\ by\ weight) = n \times M_{ethylenically\ unsaturated\ functional\ groups} / W_{polyurea\ polymer}$$

where
$C_{ethylenically\ unsaturated\ functional\ groups}$ represents the weight percentage of ethylenically unsaturated functional groups,
n represents the total molar amount of ethylenically unsaturated functional groups contained in raw materials of the UV-curable non-isocyanate polyurea polymer,
$M_{ethylenically\ unsaturated\ functional\ groups}$ represents the molar mass of the ethylenically unsaturated functional groups, and
$W_{polyurea\ polymer}$ represents the total weight of the UV-curable non-isocyanate polyuria polymer as prepared.

The content of the ethylenically unsaturated functional group falls within the above range in such a sufficient way that the non-isocyanurate polyurea polymer can be used as a resin component in a coating composition (such as a UV curable coating composition) to effect curing.

In the UV-curable non-isocyanate polyurea polymer according to the present invention, the ethylenically unsaturated functional group is covalently bonded to the backbone of the polymer via —C(=O)-linkage. In one embodiment of the invention, the C(=O)-linkage is formed by covalent bonding a carboxylic acid functional group in an ethylenically unsaturated compound having one or more carboxylic acid to carbodiimide functional groups of a multi-carbodiimide polymer. Thus, in the UV-curable non-isocyanurate polyurea polymer according to the present invention, the ethylenically unsaturated functional group is attached to the nitrogen atom of the polymer backbone urea via —C(=O)-linkage. Preferably, the UV-curable non-isocyanurate polyurea polymer of the present invention comprises —C(=O)— linkage of 3 wt % or more relative to the total weight of the UV curable non-isocyanurate polyurea polymer. Preferably, the content of the —C(=O)-linkage is dependent on the concentration of the carbodiimide functional groups in the polyurea polymer, which is 4 wt % or more or 5 wt % or more relative to the UV curable non-isocyanurate polyurea polymer. However, considering the actual conditions, the content of the —C(=O)-linkage is less than 8% by weight relative to the total weight of the UV-curable non-isocyanurate polyurea polymer.

According to the present invention, the UV-curable non-isocyanurate polyurea polymer can have a broad molecular weight distribution. Preferably, the UV-curable non-isocyanurate polyurea polymer disclosed herein may have a number average molecular weight in the range of from 1000 to 20,000 g/mol, preferably from 1500 to 20,000 g/mol, more preferably from 2000 to 20,000 g/mol. The number average molecular weight can be measured using GPC.

According to the present invention, the UV curable non-isocyanurate polyurea polymer can have a suitable viscosity to be suitable for formulating a UV curable coating composition. Preferably, the UV curable non-isocyanurate polyurea polymer disclosed herein may have a viscosity in the range of 3000 to 10,000 cps, preferably in the range of 4000 to 10,000 cps, more preferably in the range of 5000 to 10,000 cps at 25° C. The viscosity can be measured using a Brook viscometer.

In embodiments of the present invention, the non-isocyanate polyurea polymer has the structure represented by the formula (I):

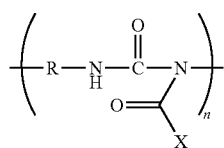

Formula I wherein R represents an aliphatic, cycloaliphatic or aromatic divalent saturated hydrocarbon group; X represents an organic moiety containing one or more ethylenically unsaturated functional groups; n represents 1 to 100.

In one embodiment of the present invention, in the non-isocyanate polyurea polymer represented by Formula I, the organic moieties X in the repeating unit each independently represents —O—CO—CH=$CH_2$.

In another embodiment of the present invention, in the non-isocyanate polyurea polymer represented by Formula I, the organic moieties X in the repeating unit each independently represents an organic segment containing 2 or more, preferably 3 or more —O—CO—CH—$CH_2$.

In still another embodiment of the present invention, in the non-isocyanate polyurea polymer represented by Formula I, the organic moieties X in the repeating unit each may be bonded to each other to form a cyclic group containing 2 or more —O—CO—CH=$CH_2$.

The UV-curable non-isocyanurate polyurea polymer according to the present invention can be prepared by (i) providing an ethylenically unsaturated compound having one or more carboxylic acid functional groups; and (ii) reacting the ethylenically unsaturated compound having carboxylic acid functional groups with a multi-carbodiimide polymer. The UV-curable non-isocyanurate polyurea polymer thus obtained comprises one or more ethylenically unsaturated functional groups, wherein the ethylenically unsaturated functional group is attached to nitrogen atoms present in the backbone urea via —C(=O)-linkage.

The inventors of the present invention have surprisingly found that the non-isocyanate polyurea polymer according to the present invention has excellent reactivity which is suitable as a film-forming resin for formulating a UV-curable coating composition, and the coating formed therefrom has excellent coating properties, including hardness and chemical resistance.

Thus, in accordance with another aspect of the invention, there is provided a process for the preparation of a UV curable non-isocyanurate polyurea polymer, the process comprising: (i) providing an ethylenically unsaturated functional groups having one or more carboxylic acid functional groups; and (ii) reacting the ethylenically unsaturated compound having carboxylic acid functional groups with a multi-carbodiimide polymer.

In some embodiments according to the present invention, the step of providing an ethylenically unsaturated compound having one or more carboxylic acid functional groups comprises providing acrylic acid or methacrylic acid, which is feasible in terms of cost and availability of raw materials.

In some embodiments according to the present invention, the step of providing an ethylenically unsaturated compound having one or more carboxylic acid functional groups comprises esterifying a hydroxyalkyl acrylate with a dicarboxylic acid to form an ethylenically unsaturated compound comprising one carboxylic acid functional group. The advantage of using this method is that the ethylenically unsaturated compound having one carboxylic acid functional group each molecule can contribute a plurality of ethylenically unsaturated functional groups to the polyurea polymer, thereby enabling the polyurea polymer to have better UV curing performance.

In such embodiments, the hydroxyalkyl acrylate is esterified with a dicarboxylic acid.

In the present invention, "hydroxyalkyl acrylate" is understood to mean an acrylate capable of providing a hydroxyl group, including an acrylate having one, two or more hydroxyl groups, preferably an acrylate having one hydroxyl group. According to the invention, the hydroxyalkyl acrylate may comprise 2-hydroxyethyl acrylate, 2-hydroxyethyl methacrylate, hydroxypropyl acrylate, hydroxypropyl methacrylate, pentaerythritol triacrylate, pentaerythritol trimethacrylate or its combination. Preferably, pentaerythritol triacrylate or pentaerythritol trimethacrylate can be used as the hydroxyalkyl acrylate.

In the present invention, "dicarboxylic acid" means a component capable of providing a carboxylic acid group or a potential carboxylic acid group. When used in the context of forming an ester with a hydroxyalkyl acrylate component, the term "carboxylic acid component" also includes ester-forming derivatives thereof, i.e., the compounds capable of reacting with a hydroxyalkyl acrylate to form a carboxylic acid ester. Ester-forming derivatives of carboxylic acids are known to those skilled in the art and include carboxylic anhydrides, acid halides, esters of carboxylic acids with lower alkanols or the like.

According to the invention, the dicarboxylic acid may comprise one or more dibasic unsaturated carboxylic acids. Examples thereof are selected from the group consisting of maleic acid, fumaric acid, mesaconic acid, citraconic acid, itaconic acid, dichloromaleic acid, anhydrides thereof, and combinations thereof. Preferably, maleic acid, maleic anhydride or a combination thereof can be used.

According to the invention, the dicarboxylic acid may also comprise one or more dibasic saturated carboxylic acids, such as aliphatic, aromatic or combinations thereof, preferably aliphatic. As a suitable example of the saturated carboxylic acid, phthalic acid, succinic acid, adipic acid, suberic acid, azelaic acid, sebacic acid, isophthalic acid, terephthalic acid, tetrachlorophthalic acid, tetrabromophthalic acid, anhydride thereof or any combination thereof can be used. Preferably, adipic acid, phthalic acid, anhydrides thereof, or combinations thereof can be used.

Preferably, the dicarboxylic acid is selected from the group consisting of succinic anhydride, maleic anhydride, phthalic anhydride and a combination thereof.

In the above esterification reaction, the appropriate conditions for the reaction to be carried depend on various factors including the type of dicarboxylic acid or hydroxyalkyl acrylate as used, the presence or absence of a catalyst, the type of catalyst if present, and the like, which can be determined empirically by those skilled in the art.

In one embodiment of the invention, the carboxylic acid component comprises succinic anhydride and the hydroxyalkyl acrylate comprises hydroxyethyl acrylate. Preferably, in this embodiment, the succinic anhydride and the hydroxyethyl acrylate are reacted at a high temperature and in the absence of a catalyst, wherein the dicarboxylic acid and the hydroxyalkyl acrylate are fed in stoichiometrically, thereby obtaining an ethylenically unsaturated compound having one carboxylic acid functional group.

In another embodiment of the invention, the carboxylic acid component comprises succinic anhydride and the hydroxyalkyl acrylate comprises pentaerythritol triacrylate. Preferably, in this embodiment, succinic anhydride and pentaerythritol triacrylate are reacted at a high temperature and in the absence of a catalyst, wherein the dicarboxylic acid and the hydroxyalkyl acrylate are fed in stoichiometrically, thereby obtaining an ethylenically unsaturated compound having one carboxylic acid functional group.

The product thus obtained, i.e. the ethylenically unsaturated compound having one carboxylic acid functional group obtained in step i), can be used directly in step ii) of the present invention.

In some embodiments of the invention, the step of providing an ethylenically unsaturated compound having one or more carboxylic acid functional groups comprises i) carrying out a ring-opening reaction of a polyglycidyl extender with (meth)acrylic acid, to form a hydroxyl intermediate having an ethylenically unsaturated functional group; and ii) esterifying the resulting hydroxyl intermediate with a dibasic carboxylic acid, thereby forming the ethylenically unsaturated compound having more than one carboxylic acid functional groups.

In the above embodiment, the polyglycidyl chain extender is subjected to a ring opening reaction with (meth)acrylic acid to form an intermediate having an ethylenically unsaturated functional group.

In the present invention, "polyglycidyl chain extender" is understood to mean a compound, oligomer or polymer which has two or more glycidyl groups for chain extension. According to the present invention, the polyglycidyl chain extender comprises polyglycidyl ester, polyglycidyl ether or a combination thereof. Preferably, polyglycidyl ether can be used as the chain extender.

According to the present invention, as an example of the polyglycidyl ether, a diglycidyl ether of a polyhydric phenol such as diglycidyl ether of resorcin, diglycidyl ether of catechol, dihydrate of hydroquinone, diglycidyl ether of bisphenol A, diglycidyl ether of bisphenol F, diglycidyl ether of bisphenol S, diglycidyl ether of tetramethyl bisphenol; a diglycidyl ether of an aliphatic diol and polyether diol, such as a diglycidyl ether of a C2-24 alkylene glycol, a diglycidyl ether of a poly(ethylene oxide) glycol or a diglycidyl ether of a poly(propylene oxide) glycol; a polyglycidyl ether of phenolic aldehyde resin, such as polyglycidyl ether of phenol-formaldehyde resin, polyglycidyl ether of alkyl-substituted phenol-formaldehyde resin, polyglycidyl ether of phenol-hydroxybenzaldehyde resin, polyglycidyl ether of cresol-hydroxybenzaldehyde resin; or a combination thereof.

According to the present invention, examples of preferred polyglycidyl ethers include diglycidyl ethers of aliphatic diols, such as diglycidyl ethers of $C_{2-24}$ alkylene glycols, such as ethylene glycol diglycidyl ether, propyl glycol diglycidyl ether, butylene glycol diglycidyl ether, hexylene glycol diglycidyl ether, nonylene glycol diglycidyl ether, dodecylene glycol diglycidyl ether, cetyl glycol diglycidyl ether, octadecyl glycol diglycidyl ether.

The polyglycidyl ethers disclosed above can be made, for example, using epichlorohydrin techniques well known to those of ordinary skill in the art. Alternatively, as an example, any commercially available product such as E55, E51, E44, E20 from Shanghai Kaiping Resin Co., Ltd. may be used.

In the above ring-opening reaction, the appropriate conditions for the reaction to be carried depend on various factors, including the type of polyglycidyl chain extender used, the presence or absence of a catalyst, the type of catalyst if present, and the like, which may be determined empirically by those skilled in the art.

The product thus obtained, i.e., the polyhydroxy intermediate having an ethylenically unsaturated functional group obtained in the step a), can be directly used in the esterification step b) with a dicarboxylic acid to form an ethylenically unsaturated compound having a plurality of carboxylic acid functional groups.

In step b), the polyhydroxy intermediate having an ethylenically unsaturated functional group obtained in step a) is esterified with a dicarboxylic acid.

In the present invention, the "polyhydroxy intermediate having an ethylenically unsaturated functional group" obtained by the step a) is understood to be a compound capable of providing a plurality of hydroxyl groups and having an ethylenically unsaturated functional group, preferably capable of providing two, three, four or more hydroxyl groups.

In the present invention, the "dicarboxylic acid" used in the step b) is as described above. Preferably, the dicarboxylic acid is selected from the group consisting of succinic anhydride, maleic anhydride, phthalic anhydride and a combination thereof.

In the above esterification reaction, the appropriate conditions for the reaction to be carried depend on various factors, including the type of dicarboxylic acid or the intermediate used, the presence or absence of a catalyst, the type of catalyst if present, etc., which may be determined empirically by those skilled in the art.

In a specific embodiment of the present invention, hexanediol diglycidyl ether is reacted with acrylic acid at a high temperature and in the absence of a catalyst, wherein hexanediol diglycidyl ether and acrylic acid are fed in stoichiometrically, thereby obtaining a polyhydroxy product having an ethylenically unsaturated functional group. Next, the product thus obtained is reacted with succinic anhydride at a high temperature and in the absence of a catalyst, wherein the reaction raw materials are fed in stoichiometrically to obtain an ethylenically unsaturated compound having a plurality of carboxylic acid functional groups.

The product thus obtained, i.e. the ethylenically unsaturated compound having a plurality of carboxylic acid functional groups obtained in step i), can be used directly in step ii) of the invention.

In step ii), the ethylenically unsaturated compound having one or more carboxylic acid functional groups of step i) is reacted with a multi-carbodiimide polymer to form a UV-curable non-isocyanate polyurea polymer.

As a suitable example of the multi-carbodiimide polymer, an aliphatic multi-carbodiimide polymer, an alicyclic multi-carbodiimide polymer, an aromatic multi-carbodiimide polymer, or a combination thereof can be used. For examples of the multi-carbodiimide polymers disclosed above, any suitable commercially available product can be used, such as Lupranate 5500XL available from BASF.

In step ii), the carboxylic acid functional group of the ethylenically unsaturated compound having one or more carboxylic acid functional groups is reacted with the carbodiimide functional group in the multi-carbodiimide polymer to form a polyurea polymer having an ethylenically unsaturated functional group wherein the ethylenically unsaturated functional group is attached to the nitrogen atom present in the backbone urea via —C(=O)-linkage as a pendant group.

In embodiments of the present invention, the ethylenically unsaturated compound having one or more carboxylic acid functional groups is stoichiometrically reacted with the multi-carbodiimide polymer. Preferably, the reaction is carried out at a temperature of from 20 to 60° C. More preferably, the reaction is carried out under normal pressure. Thus, the preparation process of the polyurea polymer according to the present invention has the advantages of simple process, high yield, and few by-products.

Suitable conditions for the reaction carried out in step ii) may vary within wide limits depending on various factors, including the type of ethylenically unsaturated compound or multi-carbodiimide polymer used, the presence or absence of a catalyst, the type of catalyst if present, etc., can be determined empirically by those skilled in the art.

The UV curable non-isocyanurate polyurea polymer obtained by the process disclosed herein can be used directly in a desired application, such as for formulating a UV curable coating composition.

Coating Composition

In another aspect of the present invention, there is provided a coating composition comprising a UV-curable non-isocyanurate polyurea polymer as disclosed herein, a photoinitiator, an optional reactive diluent, and an optional additional additive.

Specifically, the coating composition comprises, based on the total weight of the coating composition, (i) 50 to 98.5% by weight of the UV-curable non-isocyanurate polyurea polymer; (ii) 1.5 to 2.5% by weight of one or more photoinitiators; (iii) 0 to 20% by weight of optional one or more reactive diluents, preferably having two or more ethylenically unsaturated groups; and (iv) 0 to 27.5% by weight of optional additional additives.

The content of the UV-curable non-isocyanurate polyurea polymer of the present invention is in the range of 50 to 98.5% by weight, preferably 60 to 95% by weight, more preferably 70% to 90% by weight, based on the total weight of the coating composition.

The coating composition according to the present invention contains a photoinitiator which is UV curable. The coating composition undergoes a curing reaction upon exposure to UV light. The photoinitiator is preferably present in an amount of from about 0.1 wt % to about 5 wt %, based on the total weight of the coating composition. Photoinitiators suitable for the coating compositions of the present invention are alpha-cleavage photoinitiators and hydrogen abstraction photoinitiators. The photoinitiator can comprise other agents that contribute to the photochemical initiation reaction, such as co-initiators or photoinitiator synergists.

Suitable cleavage-type photoinitiators include α,α-diethoxyacetophenone (DEAP), dimethoxyphenylacetophenone (commercially available from Ciba Corp., Ardsley, N.Y. under the trade designation IRGACURE 651), hydroxycyclohexyl phenyl ketone (commercially available from Ciba Corp. under the trade designation IRGACURE 184), 2-hydroxy-2-methyl-1-phenylpropan-1-one (commercially available from Ciba Corp. under the tradename DAROCUR 1173), a blend of bis-(2,6-dimethoxybenzoyl)-2,4,4-trimethylpentylphosphine oxide and 2-hydroxy-2-methyl-1-phenylpropan-1-one in a ratio of 25:75 (commercially available from Ciba Corp. under the trade name IRGACURE 1700), a blend of 2-hydroxy-2-methyl-1-phenylpropan-1-one, and 2,4,6-trimethyl benzoyl-diphenylphosphine oxide in a ratio of 50:50 (TPO, commercially available from Ciba Corp. under the trade designation DAROCUR 4265), 2,4,6-trimethylbenzoylphosphine oxide (commercially available from Ciba Corp. under the trade name IRGACURE 819, IRGACURE 819DW and IRGACURE 2100), 2,4,6-trimethylbenzoyldiphenylphosphine oxide (commercially available from BASF Corp., Mount Olive, N.J. under the trade name LUCIRIN), and a mixture of 70% of oligomeric 2-hydroxy-2-methyl-4-(1-methylvinyl)phenylpropan-1-one and 30% 2-hydroxyl-2-methyl-1-phenylpropan-1-one (commercially available from Sartomer, Exton, Pa. under the trade designation KIP 100). Suitable hydrogen abstraction photoinitiators include benzophenone; substituted benzophenones (for example, commercially available from Fratelli-Lamberti under the trade name ESCACURE TZT, sold by Sartomer, Exton, Pa.); and other diaryl ketones such as, xanthone, thioxanthone, Michler's ketone; benzil; anthraquinones; and all of the above substituted derivatives. Preferred photoinitiators include DAROCUR 1173, KIP 100, benzophenone, and IRGACURE 184. A particularly preferred initiator mixture is commercially available from Ciba Corp. under the tradename IRGACURE 500 as a 1:1 mixture of IRGACURE 184 and benzophenone. This is a good example of a mixture of an alpha-cleavage photoinitiator and a hydrogen abstraction photoinitiator. Other mixtures of photoinitiators can also be used in the coating compositions of the present invention. Camphorquinone is an example of a photoinitiator suitable for curing a coating composition by visible light.

As a suitable example of a co-initiator or a synergist of a photoinitiator, an aliphatic tertiary amine such as methyldiethanolamine and triethanolamine, an aromatic amine such as amyl p-dimethylaminobenzoate, 2-n-butoxyethyl-4-(dimethylamino)benzoate, 2-(dimethylamino)ethyl benzoate, ethyl 4-(dimethylamino)benzoate, 2-ethylhexyl-4-(Dimethylamino)benzoate, (meth)acrylated amines (such as those commercially available under the tradenames EBECRYL 7100 and UVECRYL P104 and P115, all from UCB RadCure Specialties, Smyrna, Ga.), and amino functional acrylate or methacrylate resins or oligomers blend (such as those commercially available under the tradename EBECRYL 3600 or EBECRYL 3703, all from UCB RadCure Specialties). Combinations of the above various types of compounds can also be used.

Preferably, the photoinitiator comprises benzophenone, 4-methylbenzophenone, benzoylbenzoate, phenylacetophenone, 2,2-dimethoxy-2-phenylacetophenone, α,α-diethoxyacetophenone, hydroxycyclohexyl phenyl ketone, 2-hydroxy-2-methyl-1-phenylpropan-1-one, bis-(2,6-dimethoxy benzoyl)-2,4,4-trimethylpentylphosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, or combinations thereof.

The coating composition according to the present invention may also optionally comprise one or more reactive diluents. In the present invention, "reactive diluent" is understood to mean any radically polymerizable ethylenically unsaturated compound which can be used to adjust the viscosity of the reaction system, except for the above-mentioned UV-curable non-isocyanate polyurea polymer. Suitably, examples of the reactive diluent include styrenes such as styrene, α-methylstyrene, vinyltoluene, and vinylnaphthalene, halogenated olefins such as vinyl chloride, vinylidene chloride, vinyl fluoride, tetrafluoroethylene, and hexafluoropropylene, allyl ethers such as allyl anisole, vinyl acetate, vinyl versatate (for example, commercially available vinyl versatate VeoVa 10), acrylonitriles such as acrylonitrile and methacrylonitrile, $C_1$-$C_{16}$ alkyl (meth)acrylate, alkoxyalkyl (meth)acrylate, or combinations thereof.

The introduction of the above reactive diluent preferably provides the coating composition with the desired mechanical strength, excellent film forming properties, and adhesion properties in view of the application needs in the coatings field. Preferably, styrenes, vinyl acetate, alkyl (meth)acrylates are selected as the reactive diluent to meet the above coating application needs. More preferably, C1-16 alkyl (meth)acrylates are used. Examples of suitable C1-16 alkyl (meth)acrylates include, but are not limited to, methyl (meth)acrylate, ethyl (meth)acrylate, propyl (meth)acrylate, isopropyl (meth)acrylate, butyl (meth)acrylate, isobutyl (meth)acrylate, amyl (meth)acrylate, isoamyl (meth)acrylate, hexyl (meth)acrylate, 2-ethylhexyl (methyl)acrylate, cyclohexyl (meth)acrylate, decyl (meth)acrylate, isodecyl (meth)acrylate, lauryl (meth)acrylate, isobornyl (meth)acrylate, octyl (meth)acrylate, nonyl (meth)acrylate, and mixtures thereof. In an embodiment of the invention, the alkyl (meth)acrylate comprises methyl methacrylate, butyl acrylate or a combination thereof.

The reactive diluent according to the preset invention preferably has two or more ethylenically unsaturated groups to provide the coating composition with the desired coating properties, such as impact strength. As an example of a reactive diluent having two or more ethylenically unsaturated groups, ethylene glycol di(meth)acrylate, diethylene glycol di(meth)acrylate, propylene glycol di(methyl)acrylate, dipropylene glycol di(meth)acrylate, trimethylolpropane tri(meth)acrylate, trimethylolpropane ethoxylated tri(meth)acrylate, tripropylene glycol di(methyl)acrylate, hexanediol di(meth)acrylate, pentaerythritol tri(meth)acrylate, pentaerythritol tetra(meth)acrylate, or combinations thereof can be used. Preferably, trimethylolpropane tri(meth)acrylate can be used.

The reactive diluent is present in an amount of from about 0 to about 20 parts by weight, preferably from 0.1 to 20 parts by weight, more preferably from 5 to 20 parts by weight, based on the total weight of the coating composition.

The coating composition may also comprise one or more additional additives. Examples of additional additives suitable for use in coating compositions include surfactants, dispersants, wax auxiliaries, defoamers, rheology modifiers, colorants including pigments and dyes, fillers, heat stabilizers, flow leveling agents, matting agents, sedimentation inhibitors, light stabilizers, biological agents, plasticizers, solvents, and combinations thereof.

In one embodiment, the coating composition comprises a dispersant, a wax adjuvant, a matting agent, a leveling agent, an antifoaming agent, and a solvent as additional additives. As an example of the dispersing agent, BYK 103 available from BYK Corporation can be used. As an example of the wax adjuvant, BYK-Ceraflour 950 available from BYK Corporation can be used. As an example of the matting agent, GRACE 7000 available from Grace Corporation of USA can be used. As an example of a leveling agent, BYK 358 available from BYK Corporation can be used. As an example of the antifoaming agent, BYK-071 available from BYK Corporation can be used. As examples of the solvent, xylene, propylene glycol monomethyl ether acetate, butyl acetate, and other solvents suitable for the coating composition or any combination thereof may be used.

The content of the additional additives is in the range of 0.1 to 27.5% by weight, more preferably in the range of 0.1 to 20% by weight, based on the total weight of the coating composition.

The coating composition can be applied to a variety of different substrates using conventional coating techniques. Examples of suitable substrates include wood, cement, cement fiberboard, wood-plastic composites, tiles, metals, plastics, glass, or fiberglass. Preferably, the coating compositions of the present invention are particularly suitable for use on wood substrates. Suitable wood substrates include the substrates derived from wood materials such as oak (e.g. white oak and red oak), pine (e.g. white pine and southern yellow pine), aspen, spruce, cherry, walnut, rosewood, cedar, maple, mahogany, white birch, hickory, walnut, *eucalyptus*, etc. Preferred woods for wood substrates include those that develop color and are susceptible to UV light discoloration, such as oak, pine, maple, and the like. Further, the wood substrate may be an engineered wood product, wherein the substrate is made of wood chips (e.g., sheets, chips, flakes, fibers, threads).

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment.

EXAMPLES

Example 1: Synthesis of 4-(2-(acryloyloxy)ethoxy)-4-oxobutanoic acid (AEOA)

In a four-necked flask equipped with a thermometer, a stirrer, a nitrogen inlet, and a condenser, 116 g (1 mol) of 2-hydroxyethyl acrylate and 118 g (1 mol) of succinic acid were sequentially added, followed by heating under reflux for esterification, thereby forming AEOA. The above esterification process was as follows:

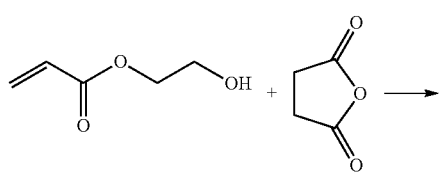

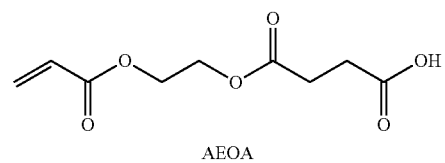

AEOA

Example 2: Synthesis of 4-(3-(acryloyloxy)-2,2-bis(acryloyloxy)propoxy)-4-oxobutanoic acid (ABOA)

In a four-necked flask equipped with a thermometer, a stirrer, a nitrogen inlet, and a condenser, 298 g (1 mol) of pentaerythritol triacrylate and 118 g (1 mol) of succinic acid were sequentially added, followed by heating under reflux for esterification, thereby forming ABOA. The above esterification process was as follows:

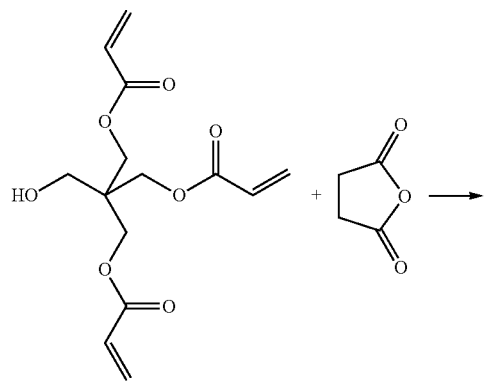

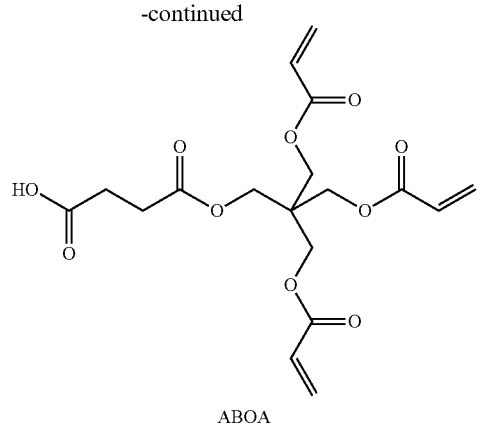

ABOA

Example 3: Synthesis of 6,17-bis((acryloyloxy)methyl)-4,19-dioxo-5,8,15,18-tetraoxatetradecane-1,22-diacid (BDTDA)

In a four-necked flask equipped with a thermometer, a stirrer, a nitrogen inlet, and a condenser, 230 g (1 mol) of 1,6-hexanediol diglycidyl ether and 144 g (2 mol) of acrylic acid were sequentially added, followed by heating under reflux for ring-opening reaction, thereby forming an epoxy acrylate, i.e. (hexane-1,6-diylbis(oxy))bis(2-hydroxypropane-1,3-diyl)diacrylate, HBDA. The obtained 1 mol of HBDA was then esterified with 2 mol of succinic anhydride to obtain BDTDA in the form of a viscous liquid. The above synthesis process was as follows:

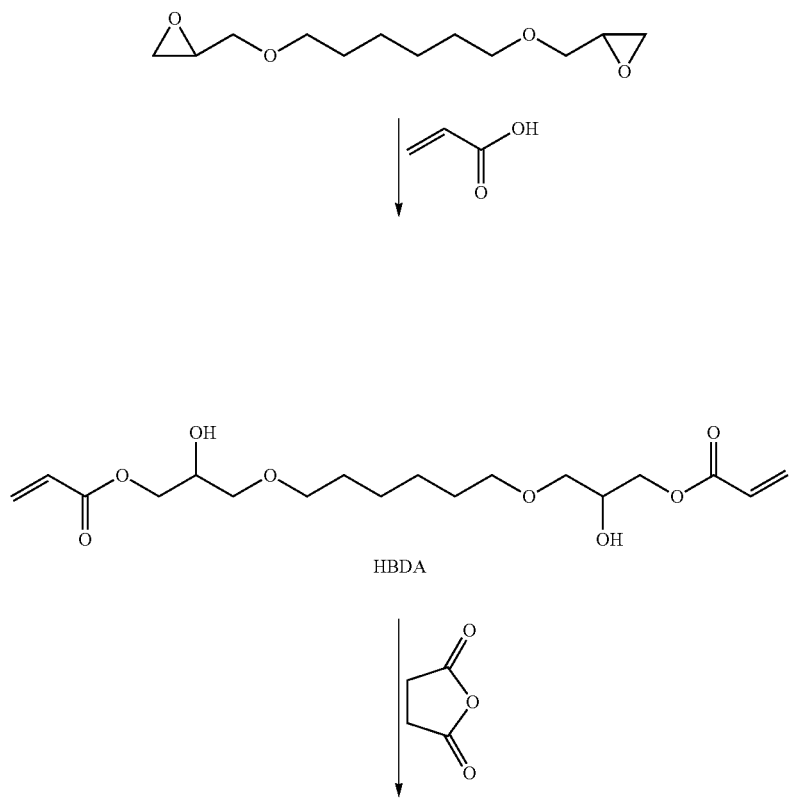

HBDA

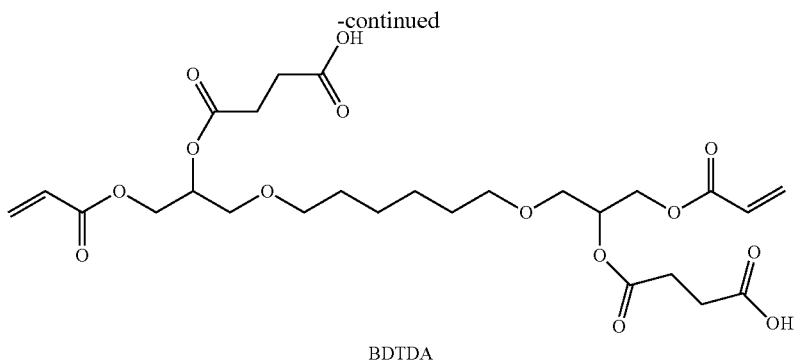

BDTDA

Example 4: Synthesis of UV Curable Non-Isocyanate Polyurea Polymer

The amounts of acrylic acid (AA) and the AEOA, ABOA and BDTDA synthesized in the above Examples 1-3 shown in the table below were respectively mixed with Lupranate 5500 XL (BASF, carbodiimide content 8.1%) in stoichiometric amounts, and the reaction was carried out at 40° C. until the contents of AA, AEOA, ABOA and BDTDA were reduced to less than 1% by GC-MS to form the target product.

| Item | Lupranate 5500XL | AA | AEOA | ABOA | BDTDA |
|---|---|---|---|---|---|
| P1 | 137 | 20 | — | — | |
| P2 | 44.6 | — | 20 | — | |
| P3 | 22 | — | — | 20 | |
| P4 | 29.9 | — | — | — | 20 |

Example 5: Properties of UV Curable Coating Compositions and Coatings Thereof The polymers P1, P2, P3 and P4 obtained in Example 4 were mixed with 1,1,1 trimethylolpropane triacrylate TMPTA and photoinitiator Irgacure 500, respectively, in the amounts indicated in the table below, thereby obtaining the desired mixtures F1, F2, F3 and F4. The resulting mixtures each was coated to form a film according to the standard GB/T 1730-2007 and was exposed to UV light to obtain a cured coating. Then, the chemical resistance of the resulting coating layer was measured. The test results were as follows.

| | Composition | F1 | F2 | F3 | F4 |
|---|---|---|---|---|---|
| | Polyurea polymer/g | 157 | 64.6 | 42 | 49.9 |
| | TMPTA/g | 28.3 | 12.6 | 8.7 | — |
| | Irgacure/g | 4.38 | 1.95 | 1.35 | 1.25 |
| | Properties | | | | |
| | Pendulum hardness | 89 | 88 | 85 | 108 |
| Chemical | 70% Ethanol (1 h) | 4 | 3 | 4 | 3 |
| Resistance | 10% NH$_4$OH (1 min) | 5 | 5 | 5 | 5 |
| | 50 g/L NaHCO$_3$ (1 h) | 5 | 4 | 4 | 4 |
| | 10% Na$_2$CO$_3$ (1 h) | 3 | 4 | 4 | 4 |
| | 10% Acetic acid (1 h) | 4 | 4 | 5 | 4 |
| | 4% Coffee (1 h) | 4 | 4 | 4 | 4 |
| | 1% Tea (1 h) | 5 | 4 | 4 | 4 |
| | Red Wine (1 h) | 5 | 4 | 4 | 4 |
| | Vinegar (1 h) | 5 | 4 | 5 | 4 |
| | Hot water (15 min) | 5 | 3 | 3 | 2 |

Chemical resistance:
5 = best;
0 = worst

As can be seen from the above results, the polyurea polymer synthesized according to the method of the present invention can be used to formulate a UV-curable coating composition, and the coating formed therefrom has excellent coating properties such as pendulum hardness and chemical resistance.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A UV-curable non-isocyanate polyurea polymer having one or more ethylenically unsaturated functional groups, wherein the ethylenically unsaturated functional group is attached to a nitrogen atom present in a backbone urea segment via —C(═O)—linkage, and wherein the non-isocyanate polyurea polymer is prepared by:
   (i) providing an ethylenically unsaturated compound having one or more carboxylic acid functional groups; and
   (ii) reacting said ethylenically unsaturated compound having one or more carboxylic acid functional groups with a multi-carbodiimide polymer to form the non-isocyanate polyurea polymer;
   wherein providing an ethylenically unsaturated compound having one carboxylic acid functional group comprises esterifying a hydroxyalkyl acrylate with a dibasic carboxylic acid, thereby forming the ethylenically unsaturated compound having one carboxylic acid functional group.

2. The non-isocyanate polyurea polymer of claim 1, wherein the non-isocyanate polyurea polymer comprises, relative to the total weight of the non-isocyanate polyurea polymer, 3 wt % or more of the —C(═O)— linkage.

3. The non-isocyanate polyurea polymer of claim 1, wherein the non-isocyanate polyurea polymer comprises, relative to the total weight of the non-isocyanate polyurea polymer, 3 wt % or more of the ethylenically unsaturated functional groups.

4. The non-isocyanate polyurea polymer of claim 1, wherein the non-isocyanate polyurea polymer further comprises one or more carbodiimide groups within its backbone segments.

5. The non-isocyanate polyurea polymer of claim 1, wherein providing an ethylenically unsaturated compound having one carboxylic acid functional group comprises providing acrylic acid or methacrylic acid.

6. The non-isocyanate polyurea polymer of claim 1, wherein the hydroxyalkyl acrylate is selected from the group consisting of 2-hydroxyethyl acrylate, 2-hydroxyethyl methacrylate, hydroxypropyl acrylate, hydroxypropyl methacrylate, pentaerythritol triacrylate, pentaerythritol trimethacrylate, and combinations thereof.

7. The non-isocyanate polyurea polymer of claim 1, wherein the dibasic carboxylic acid comprises a dibasic saturated carboxylic acid, a dibasic unsaturated carboxylic acid or a combination thereof.

8. The non-isocyanate polyurea polymer of claim 1, wherein the multi-carbodiimide polymer comprises an aliphatic multi-carbodiimide polymer, a cycloaliphatic multi-carbodiimide polymer, an aromatic multi-carbodiimide polymer or the combination thereof.

9. The non-isocyanate polyurea polymer of claim 1, wherein the non-isocyanate polyurea polymer has the structure represented by the formula (I):

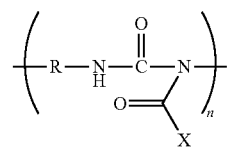

Formula I wherein R represents an aliphatic, cycloaliphatic or aromatic divalent saturated hydrocarbon group; X represents an organic moiety containing an ethylenically unsaturated functional group, preferably containing more than one ethylenically unsaturated functional groups; and n represents 1 to 100.

* * * * *